US008307544B2

(12) United States Patent
Natoli et al.

(10) Patent No.: US 8,307,544 B2
(45) Date of Patent: Nov. 13, 2012

(54) COAXIAL CABLE CONNECTOR TOOL

(75) Inventors: Christopher P. Natoli, Fulton, NY (US); John H. Koeppel, Cheektowaga, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 0 days.

(21) Appl. No.: 12/905,411

(22) Filed: Oct. 15, 2010

(65) Prior Publication Data

US 2012/0090169 A1 Apr. 19, 2012

(51) Int. Cl.
*B23P 19/00* (2006.01)

(52) U.S. Cl. ................ 29/751; 29/748; 29/750; 29/752; 72/409.14

(58) Field of Classification Search .................... 29/748, 29/750, 751, 752, 758; 72/409.14
See application file for complete search history.

(56) References Cited

U.S. PATENT DOCUMENTS 2,333,120 A * 11/1943 Parker ............................ 29/237
3,175,281 A 3/1965 Elfsten
3,325,885 A 6/1967 Ziegler, Jr. et al.
3,365,927 A 1/1968 Lynch
3,644,874 A 2/1972 Hutter
3,673,547 A 6/1972 Ziegler, Jr.
3,732,718 A 5/1973 Barberio et al.
3,778,535 A 12/1973 Forney, Jr.
3,845,538 A 11/1974 Demler, Sr.
4,131,332 A 12/1978 Hogendobler et al.
4,136,549 A 1/1979 Lytle et al.
4,377,320 A 3/1983 Lathrop et al.
4,408,822 A 10/1983 Nikitas
4,653,309 A 3/1987 Hendricks et al.
4,795,370 A 1/1989 Freitag
4,932,091 A 6/1990 Krzyzanski
5,137,471 A 8/1992 Verespej et al.
5,295,864 A 3/1994 Birch et al.
5,335,531 A 8/1994 Mann et al.
5,392,508 A 2/1995 Holliday et al.
5,435,167 A 7/1995 Holliday et al.
5,537,727 A 7/1996 Mayer
5,607,325 A 3/1997 Toma
5,647,119 A * 7/1997 Bourbeau et al. ............... 29/751
5,667,405 A 9/1997 Holliday
5,785,554 A 7/1998 Ohshiro
5,845,393 A 12/1998 DePaiva
5,857,865 A 1/1999 Shimirak et al.
5,877,452 A 3/1999 McConnell
5,879,191 A 3/1999 Burris
5,941,120 A * 8/1999 Jee ............................ 72/409.14
5,975,951 A 11/1999 Burris et al.
5,984,723 A 11/1999 Wild
5,997,350 A 12/1999 Burris et al.

(Continued)

*Primary Examiner* — Carl Arbes
(74) *Attorney, Agent, or Firm* — Schmeiser, Olsen & Watts, LLP

(57) ABSTRACT

Disclosed herein is a coaxial cable connector compression tool including an actuator and a body in operable communication with the actuator. The coaxial cable connector compression tool includes a first set of jaws operably associated with the body and dimensioned to receive and engage a first coaxial cable connector, the first set of jaws including a first recess and a second set of jaws operably associated with the body and dimensioned to receive and engage a second coaxial cable connector having different dimensions than the first coaxial cable connector, the second set of jaws including a second recess, wherein the first recess and the second recess reside on a single plane and extend in non-parallel directions. Further, the actuator is configured to trigger compression of both the first and second set of jaws at the same time.

10 Claims, 9 Drawing Sheets

U.S. PATENT DOCUMENTS

| | | | |
|---|---|---|---|
| 6,089,913 | A | 7/2000 | Holliday |
| D436,076 | S | 1/2001 | Montena |
| 6,210,222 | B1 | 4/2001 | Langham et al. |
| 6,227,030 | B1 | 5/2001 | Lefavour et al. |
| 6,253,449 | B1 | 7/2001 | Chen |
| 6,272,738 | B1 | 8/2001 | Holliday et al. |
| 6,708,396 | B2 | 3/2004 | Holliday |
| 6,780,052 | B2 | 8/2004 | Montena et al. |
| 6,820,326 | B1 | 11/2004 | Tarpill et al. |
| D520,828 | S | 5/2006 | Steiner |
| 7,096,573 | B2 | 8/2006 | Holliday |
| 7,152,309 | B2 | 12/2006 | Liao |
| 7,299,542 | B2 | 11/2007 | Montena |
| 7,299,543 | B2 | 11/2007 | Montena |
| 7,703,196 | B2 * | 4/2010 | Chawgo .......................... 29/751 |
| 8,006,537 | B2 * | 8/2011 | Liu ............................ 72/409.14 |
| 2001/0034159 | A1 | 10/2001 | Pitschi |
| 2003/0177586 | A1 | 9/2003 | Chen |
| 2006/0179646 | A1 | 8/2006 | Xie et al. |
| 2006/0191132 | A1 | 8/2006 | Montena |
| 2006/0230608 | A1 | 10/2006 | Caveney et al. |

* cited by examiner

COAXIAL CABLE CONNECTOR TOOL

FIELD OF TECHNOLOGY

The subject matter disclosed herein relates generally to the field of tools for connecting coaxial cable connectors to cable ends by compression. More particularly, the subject matter disclosed herein pertains to a coaxial cable connector compression tool comprising a jaw configured to accommodate different sized connectors and a method of use thereof.

BACKGROUND

Cable communications have become an increasingly prevalent form of electromagnetic information exchange and coaxial cables are common conduits for transmission of electromagnetic communications. Connectors for coaxial cables are typically connected onto cable ends to facilitate cable connection with complementary interface ports to electrically integrate coaxial cables to various electronic devices. Compression tools are useful in affixing the connectors to the cable ends because the tools provide increased mechanical advantage effective for securely compressing the connectors onto the cables.

There are many coaxial cable connector compression tools available for use in fastening coaxial cable connectors. Typically, connector compression tools can only accommodate one size of connector. In order to accommodate different sized connectors having different diameters and/or different lengths, typical connector compression tools include additional parts or components such as movable stops, flexible-hinged jaws, replaceable jaws and swiveling heads. Further, the tools often require springs, pivots, screws and other components to accommodate different sized connectors. These additional parts add complexity and cost to the connector compression tools.

Accordingly, a coaxial cable connector compression tool for the accommodation of more than one connector, and a method of use thereof, would be well received in the art.

SUMMARY

A first general aspect is described as a coaxial cable connector compression tool comprising a body; an actuator in communication with the body, the actuator comprising a handle having two levers extending from the body; a first set of jaws operably associated with the body and dimensioned to receive and engage a first coaxial cable connector, the first set of jaws including a first recess; and a second set of jaws operably associated with the body and dimensioned to receive and engage a second coaxial cable connector having different dimensions than the first coaxial cable connector, the second set of jaws including a second recess, wherein the first recess and the second recess reside on a single plane and extend in non-parallel directions; wherein the actuator is configured to trigger compression of both the first and second set of jaws at the same time.

A second general aspect is described as a coaxial cable connector compression tool comprising a body; an actuator in communication with the body, the actuator comprising a handle having two levers extending from the body, the two levers rotatable about a fulcrum; a first channel operably associated with the body and dimensioned for receiving a first coaxial cable connector, the first channel including a first recess extending from a first plane, wherein the first channel is configured to compress the first coaxial cable connector; and a second channel operably associated with the body and dimensioned for receiving a second coaxial cable connector, the second channel including a second recess wherein the second channel is configured to compress the second coaxial cable connector, and wherein the second recess extends from a second plane, the second plane being parallel to the first plane; wherein compression of the two levers about the fulcrum initiates compression of both the first and second channels.

A third general aspect is described as a coaxial cable connector compression tool comprising a body; an actuator in communication with the body, the actuator comprising a handle having two levers extending from the body, the two levers rotatable about a fulcrum; a first channel operably associated with the body, the first channel including a first means for accommodating compression of a first coaxial cable connector, wherein rotating the two levers about the fulcrum initiates the first means, and wherein the first means is accessible by a first recess extending from a first plane; and a second channel operably associated with the body and on an opposite side of the body than the first channel, the second channel including a second means for accommodating compression of a second coaxial cable connector having different dimensions than the first connector, wherein rotating the two levers about the fulcrum initiates the second means, and wherein the second means is accessible by a second recess extending from a second plane, the second plane being parallel to the first plane.

A fourth general aspect is described as a method of compressing a connector, said method comprising providing a coaxial cable connector compression tool, wherein the coaxial cable connector compression tool comprises: a body; an actuator in communication with the body, the actuator comprising a handle having two levers extending from the body; a first set of jaws operably associated with the body and dimensioned to compress a first coaxial cable connector, the first set of jaws including a first recess; and a second set of jaws operably associated with the body and dimensioned to compress a second coaxial cable connector having different dimensions than the first coaxial cable connector, the second set of jaws including a second recess, wherein the first recess and the second recess reside on a single plane and extend in non-parallel directions; wherein the actuator is configured to activate compression of both the first and second set of jaws at the same time; placing at least one of the first coaxial cable connector and the second coaxial cable connector with the provided connector compression tool such that the placed coaxial cable connector operatively engages at least one of the first set of jaws and the second set of jaws; and activating the actuator.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
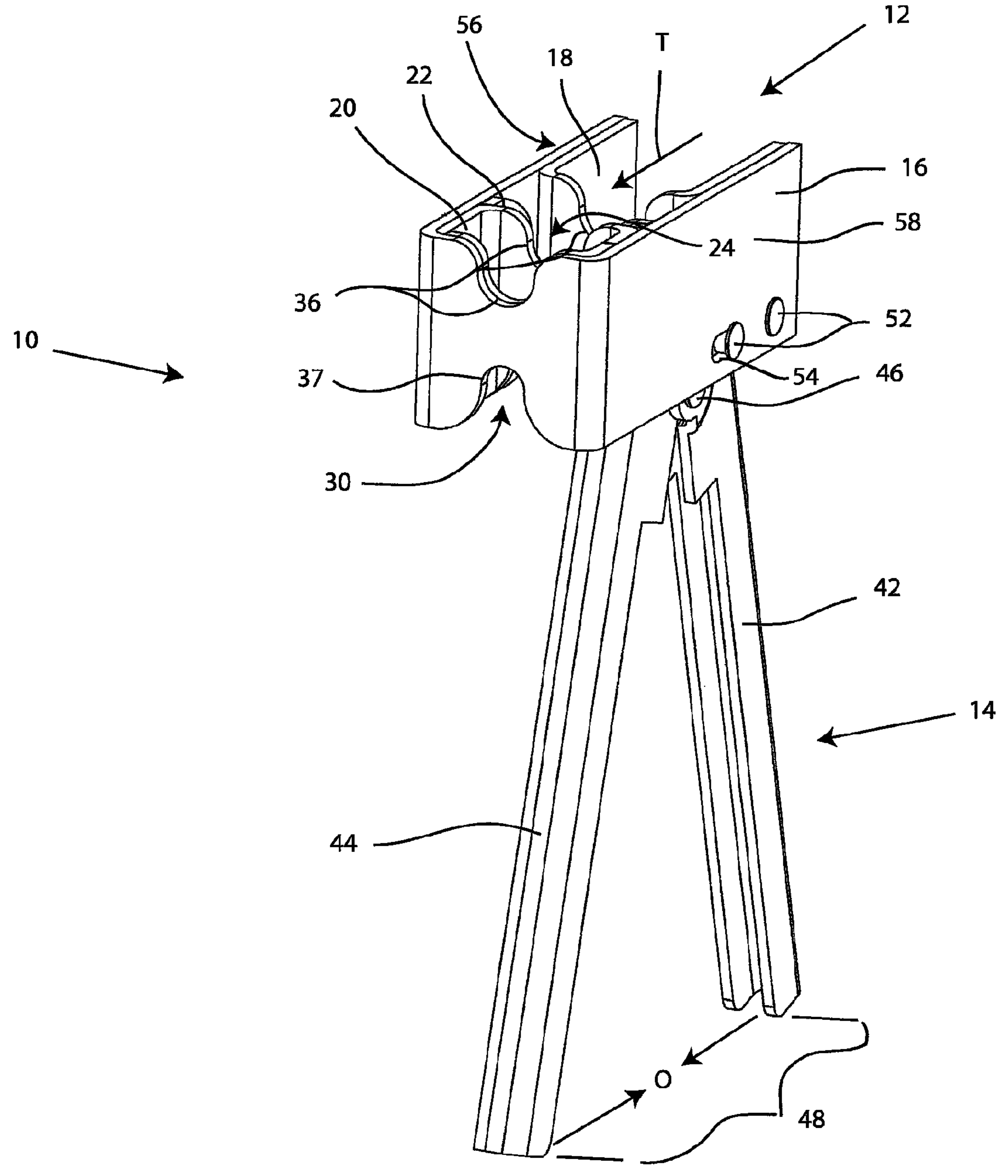
FIG. 1 depicts a perspective view of an embodiment of a connector compression tool.
Figure 2:
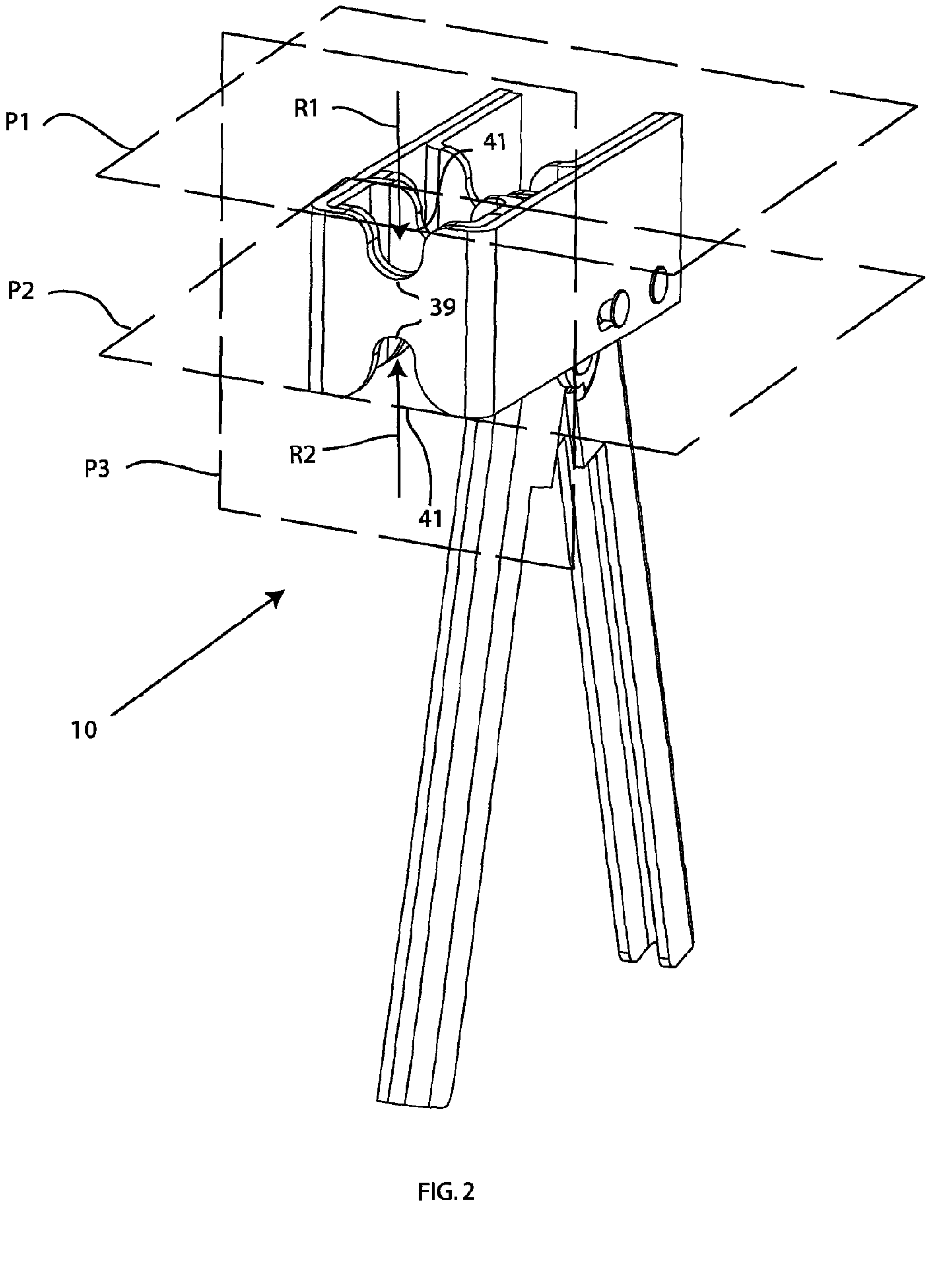
FIG. 2 depicts a perspective view of the connector compression tool of FIG. 1.

Referring to the drawings, FIGS. 1 and 2 depict an embodiment of a connector compression tool 10. The connector compression tool 10 comprises a body 12 and an actuator 14. The body 12 includes an outer frame 16, a compressor element 18, a jaw offset element 20, and an alignment plate 22. The body 12 further includes a first channel 24 having a first set of jaws 26, 28 (shown in FIGS. 2-4) and a second channel 30 having a second set of jaws 32, 34 (shown in FIGS. 6-8). Each of the channels 24, 30 may be located on an opposite side of the body 12 and defined by a set of recesses 36, 37 in the body portions 16, 18, 20, 22. As shown in FIG. 2, the first set of recesses 36 and the first channel 24 may extend from a first plane P1, while the second set of recesses 37 and the second channel 30 may extend from a second plane P2 that is parallel to the first plane P1. It should be understood that the term “extend” means that the recesses open in a certain direction. To “extend from a plane” means specifically that the recesses open in a particular direction R1, R2 facing a cradling end of the recess 39 from an open end of the recess 41. Furthermore, the first channel 24 may include a first recess residing on the same plane, such as a plane P3, and extending in a non-parallel direction in relation to a second recess. It should be understood that the term “residing on” means that the entirety of the recess is located on a plane. Each of the channels 24, 30 and corresponding jaws 26, 28, 32, 34 are dimensioned to receive and engage a connector 38, 40 (shown in FIGS. 4, 5, 7, 8 and 9) of a different type, including connectors of different sizes, lengths, diameters or other dimensions. The jaws 26, 28, 32, 34 may be configured to compress the connectors 38, 40. The actuator 14 is shown in the Figures as a handle having two levers 42, 44 and connected to the body 12 of the connector compression tool 10 at a fulcrum 46. Squeezing the levers 42, 44 together in a direction O effectuates movement of the compressor element 18 in a direction T relative to the outer frame 16, thereby compressing both the first and second set of jaws 26, 28, 32, 34 and any connector received. Thus, the connector compression tool 10 is configured to allow an operator to compress at least two different connectors without requiring the operator to make adjustments between uses or to use completely different tools for each connector.

Figure 4:
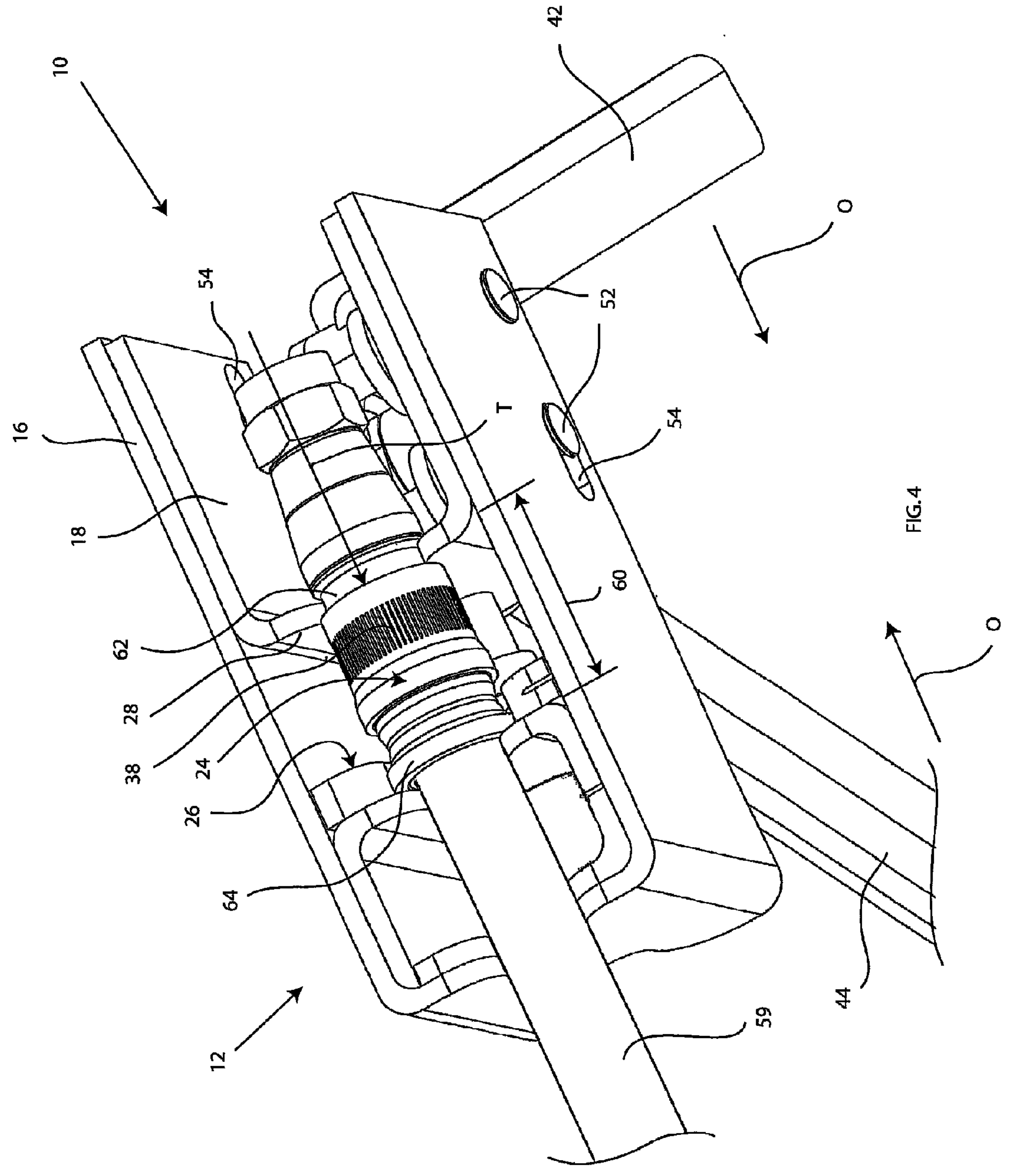
FIG. 4 depicts a perspective view of an embodiment of a first connector placed within an embodiment of a first channel of an embodiment of a connector compression tool prior to compression of the first connector.
Figure 5:
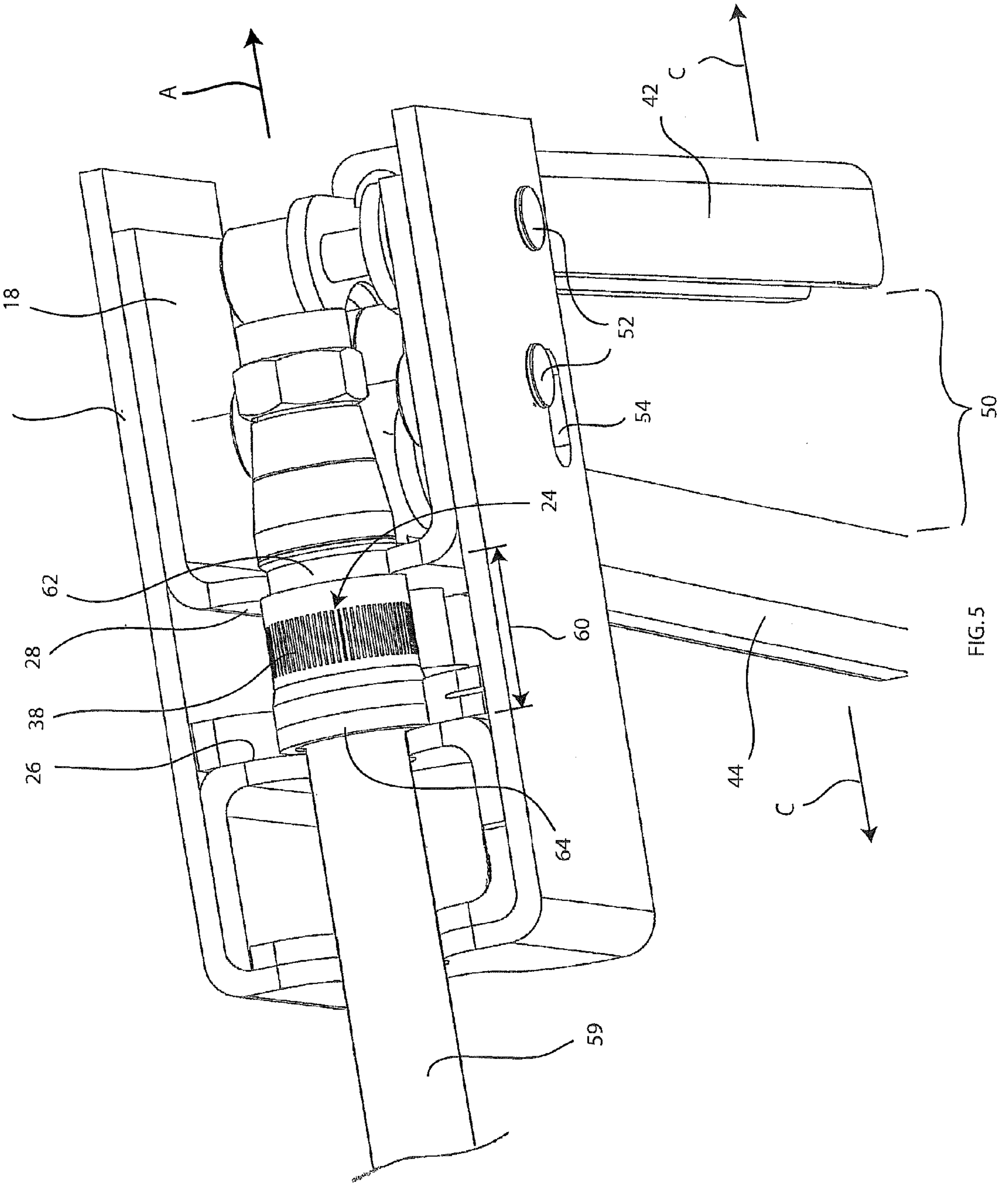
FIG. 5 depicts a perspective view of an embodiment of a first connector placed within an embodiment of a first channel of an embodiment of a connector compression tool after compression of the first connector.
Figure 7:
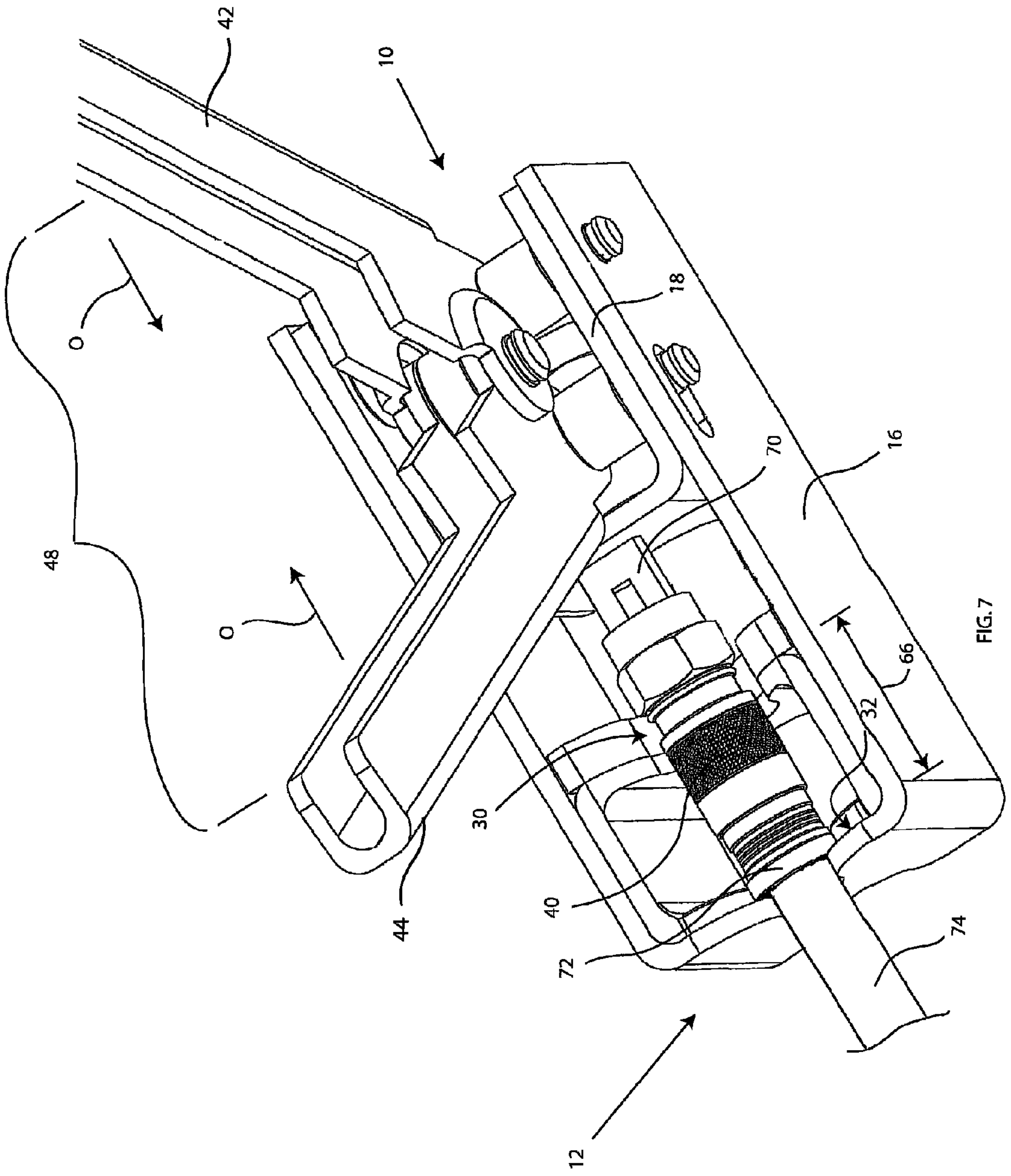
FIG. 7 depicts a perspective view of an embodiment of a second connector placed within an embodiment of a second channel of an embodiment of a connector compression tool prior to compression of the second connector.
Figure 8:
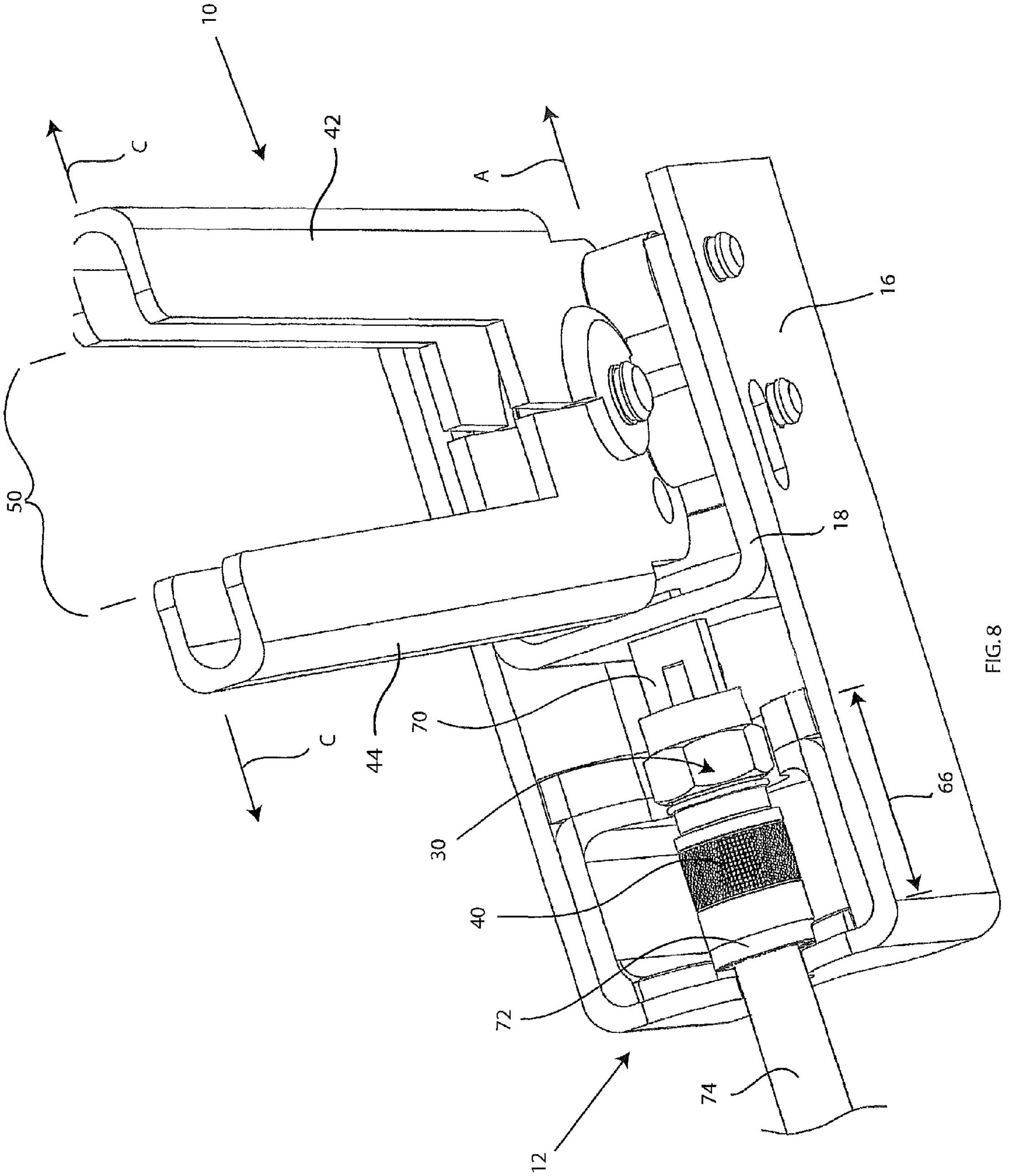
FIG. 8 depicts a perspective view of an embodiment of a second connector placed within an embodiment of a second channel of an embodiment of a connector compression tool after compression of the second connector.

The handle actuator 14 is shown having the two levers 42, 44 capable of being moved relative to each other from a first position 48 to a second position 50 (shown in FIGS. 4 and 7). The levers 42, 44 are shown extending from the side of the body 12 having the second channel 30 and the second set of recesses 37. In alternate embodiments, the levers 42, 44 may extend from another side of the body 12, such as the side having the first channel 24 and first set of recesses 36. However, the levers 42, 44 are attached about the fulcrum 46 such that pivotally moving the levers 42, 44 about the fulcrum 46 from the first position 48 to the second position 50 in the direction O effectuates movement of the compressor element 18 in a direction T. The compressor element 18 may be operable with at least one of the jaws 26, 28, 32, 34. Thus, the compression element 18 may thereby compress the jaws 26, 28, 32, 34 and any cable connector operably received thereby. Pivotally moving the levers 42, 44 apart in a direction C (as shown in FIGS. 5 and 8) from the second position 50 to the first position 48 effectuates movement of the compressor element 18 in a direction A, thereby uncompressing the jaws 26, 28, 32, 34. The levers 42, 44 may be spring loaded so that they remain in the first position 48 prior to exposure to an outside force, such as the force applied by a tool operator. In one embodiment, only one of the levers 42 moves relative to the body 12 to initiate compression or decompression of the jaws 26, 28, 32, 34, while the other lever 44 remains pivotally static. In other embodiments, both levers 42, 44 move with respect to the body 12 to initiate movement of the jaws 26, 28, 32, 34.

Furthermore, the levers 42, 44 may rotate about a fulcrum 46. The handle actuator 14 and fulcrum 46 may be attachable to the body 12 via one or more moveable trunnions 52. As shown, one moveable trunnion 52 is statically attached to the outer frame 16 while another trunnion 52 is statically attached to the compressor element 18. Respective openings 54 in the outer frame 16 and the compressor element 18 allow movements of the trunnions 52 when the levers 42, 44 are moved relative to each other. It should be understood that the moveable trunnions 52 may also be guide posts, push stems, position pegs or the like and may be comprised of metal or another appropriate material. While one embodiment of the actuator 14 has been described and shown in the Figures as a two levered handle, other embodiments are contemplated which may similarly initiate compression and compress the jaws 26, 28, 32, 34. For example, a single lever may be rotated, compressed or otherwise moved in order to initiate or trigger compression. Alternately, an electronic actuator may be used whereby the connector compression tool 10 may include an integrated battery to power compression, the compression being activated by a simple button or electronic control (not shown). Hydraulic or pneumatic actuation is also contemplated. It should be recognized that any type of actuator is contemplated which may be used to selectively compress and uncompress the jaws 26, 28, 32, 34 or move the compressor element 18 with respect to the outer frame 16.

In the embodiment shown, the second channel 30 and second set of jaws 32, 34 are located on a side of the body 12 from which the handle actuator 14 extends. In contrast, the first channel 24 and first set of jaws 26, 28 are located on an opposite side of the body 12 from which the handle actuator 14 extends. Alternately, the first and second channels 24, 30 and first and second set of jaws 26, 28, 32, 34 may both be rotated 90 degrees on the body 12 about an axis parallel to the direction T. In this embodiment the first and second channels 24, 30 and first and second set of jaws 26, 28, 32, 34 may still be located on opposite sides 56, 58, respectively, of the body. In other embodiments, the first channel 24 and corresponding first set of jaws 26, 28 may be oriented to face any direction that is different than the direction the second channel 30 and second set of jaws 32, 34 are facing. In other words, the planes P1, P2, from which the recesses 36, 37 of the channels 24, 30 extend, may be located in any two different positions. For example, only the second channel 30 and corresponding second set of jaws 32, 34 may be moved to one of the sides 56, 58, while the first channel 24 and corresponding first set of jaws 26, 28 remains in the location depicted in the Figures. As shown, the body 12 is substantially six sided. As an example, the first channel 24 and first set of jaws 26, 28 may be located on a side of the body 12 adjacent the second channel 30 and second set of jaws 32, 34. Additionally, the location of the first channel 24 and corresponding first set of jaws 26, 28 may be such that the channel 24 and jaws 26, 28 receive a correspondingly dimensioned connector for compression at a different and unique location than the second channel 30 and second set of jaws 32, 34 receive a correspondingly dimensioned connector. As shown in the Figures, the channels 24, 30 may be separated by a middle structure of the body. Alternately, however, the channels 24, 30 combined may create an opening that wholly runs through the length of a side of the body 12. In this embodiment, the unique locations that each of the channels 24, 30 receive the correspondingly dimensioned connectors 38, 40 may partially overlap. Additionally, while the embodiments depicted in the Figures show two channels 24, 30 and two sets of jaws 26, 28, 32, 34, other embodiments may have more than two channels, each oriented to face a different direction.

Figure 3:
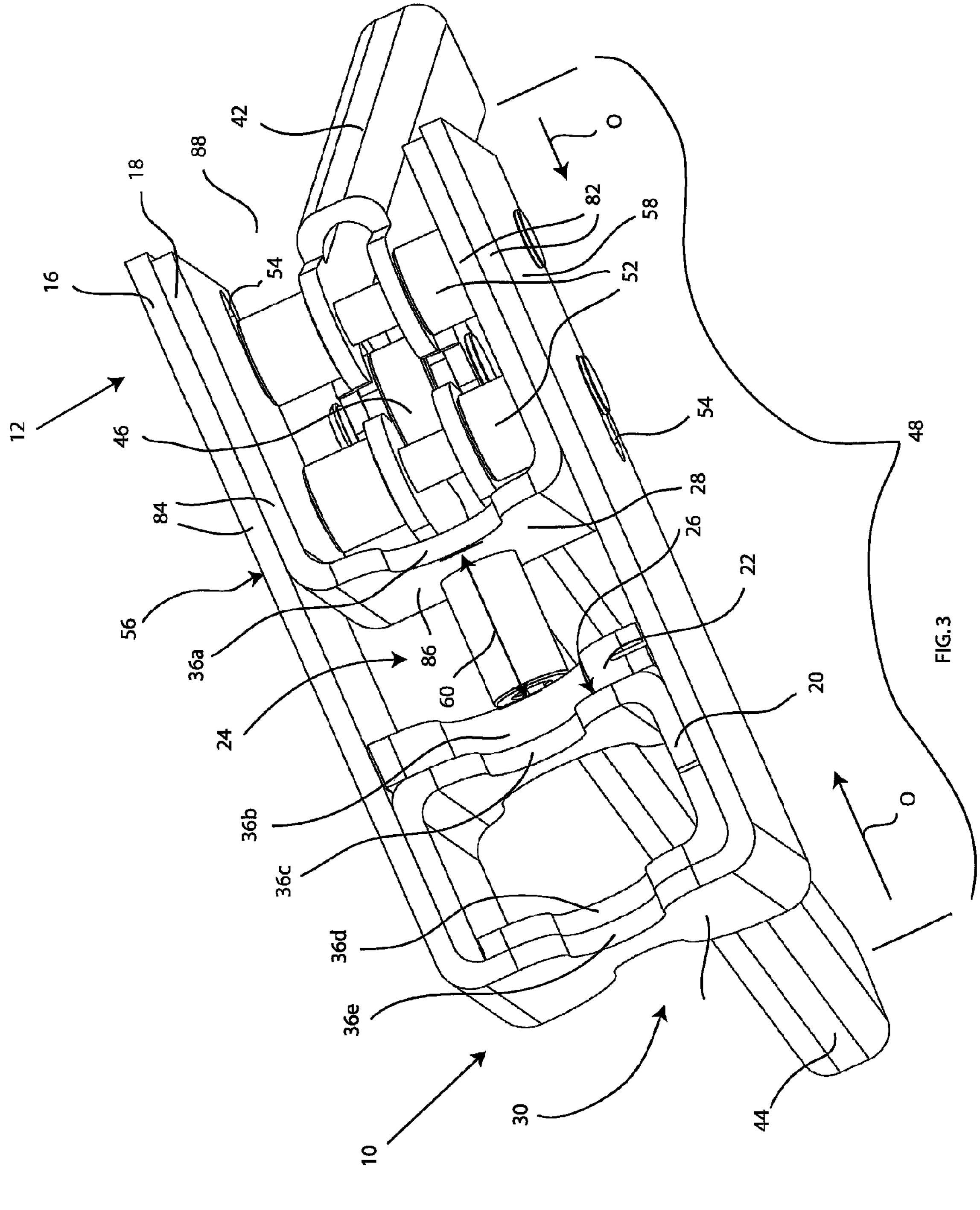
FIG. 3 depicts a perspective view of an embodiment of a first channel and first set of jaws of an embodiment of the connector compression tool.

Referring now to FIG. 3, a perspective view of the first channel 24 of the connector compression tool 10 of FIG. 1 is shown. The first channel 24 is shown defined by a plurality of recesses 36*a*, 36*b*, 36*c*, 36*d*, 36*e* in the body portions 16, 18, 20, 22. Particularly, the compressor element 18 has a recess 36*a*, the alignment plate 22 has a recess 36*b*, the jaw offset element 20 has two recesses 36*c*, 36*d*, and the outer frame 16 has a recess 36*e*. Shown in the Figures, the recesses 36*a*, 36*b*, 36*c*, 36*d*, 36*e* each include a semi-annular, or half circular section to facilitate receiving of various circular cross sections of the connector 38. The edges of where the recesses 36*a*, 36*b*, 36*c*, 36*d*, 36*e* begin may also be rounded, as shown in the Figures, but may alternately come to an angular or sharp point. The recesses 36*a*, 36*b*, 36*c*, 36*d*, 36*e* may be substantially U-shaped, as shown in the Figures. The diameters and curvature of each of the semi-annular portions of the recesses 36*a*, 36*b*, 36*c*, 36*d*, 36*e* are dimensioned to receive a corresponding diameter and curvature of a length of the first connector 38 and an extending cable 59, shown in FIGS. 4-5. While the recesses 36*a*, 36*b*, 36*c*, 36*d*, 36*e* are shown to each include a semi-annular, or half-circular sections, it should be understood that the recesses may be any appropriate shape capable of receiving and compressing a connector. For example, the recesses 36*a*, 36*b*, 36*c*, 36*d*, 36*e* may include partial hexagonal, octagonal or ovular recesses. The shape of the recesses 36*a*, 36*b*, 36*c*, 36*d*, 36*e* may depend on the shape of the connector to be received and compressed. Additionally, the recesses 36*a*, 36*b*, 36*c*, 36*d*, 36*e* may have any appropriate depth corresponding to complimentary connector components. Furthermore, each individual recess 36*a*, 36*b*, 36*c*, 36*d*, 36*e* may have a different shape or dimension than another of the recesses 36*a*, 36*b*, 36*c*, 36*d*, 36*e*. It should be understood that while the first channel includes a plurality of recesses 36*a*, 36*b*, 36*c*, 36*d*, 36*e*, any number of appropriate recesses are contemplated. For example, even a single recess may define the first channel 24.

With continued reference to FIG. 3, the first set of jaws 26, 28 are shown prior to the reception of a connector. Additionally, a first compression region 60 is shown located between the first set of jaws 26, 28. Jaw 26, is defined by the wall of the jaw offset element 20 that is adjacent and facing the alignment plate 22. The jaw 26 includes a compression surface that is defined by the offset between the larger recess 36*c* of the alignment plate 22 and the smaller recess 36*b* of the jaw offset element 20. Particularly, the semi-annular section of the recess 36*b* has a larger diameter than the semi-annular section of the recess 36*c* of the jaw offset element 20. Jaw 28, is defined by the wall of the compressor element 18 that is adjacent to the first compression region 60 and includes the recess 36*a*. The first set of jaws 26, 28 are configured to work in conjunction to facilitate compression of a connector, such as connector 38. The jaws 26, 28 may act as a pair or set of holding devices or connector engagement elements comprising opposing parts of the connector compression tool 10 to hold and compress a connector, such as connector 38. The first set of jaws 26, 28 may be relatively movable toward and away from each other as the actuator 14 is triggered or initiated, as described hereinabove. Particularly, the movement of the compressor element 18 with respect to the outer frame 16 may bring the jaws 26, 28 closer to each other to compress the first compression region 60. While the embodiments shown in the Figures show each set of jaws containing a pair of jaw elements, it should be understood that a set of jaws may comprise more than two jaw elements, or compression surfaces, in other embodiments.

As shown in FIGS. 4-5, the first channel 24 is shown after reception of the first coaxial cable connector 38. The recess 36*a* is dimensioned to receive a reduced diameter portion 62 of the connector 38, the recess 36*b* is dimensioned to receive a compression ring 64 of the first coaxial cable connector 38, and the smaller recess 36*c* is dimensioned to receive the cable 59 that may extend in the direction T from the connector 38. The smaller recess 36*c* is configured to prevent movement of the received compression ring 64 in the direction T during compression. FIG. 4 depicts the tool 10 having received the first connector 38 in this way, prior to compression of the first connector 38. As such, the levers 42, 44 are in the first position 48 prior to movement in the direction O, and prior to movement of the compressor element 18 with respect to the outer frame 16 in the direction T. FIG. 5 depicts the tool 10 after compression of the jaws 26, 28 and of the received first connector 38. Thus, the levers 42, 44 are in the second position 50 after being pivotally moved about the fulcrum 46 with respect to each other in the direction O, and after movement of the compressor element 18 with respect to the outer frame 16 in the direction T. Decompression of the levers 42, 44, and the jaws 26, 28, may occur when the levers are pivotally moved about the fulcrum 46 with respect to each other back in the direction C. This may cause the compressor element 18 to move in a direction A relative to the outer frame 16.

Figure 6:
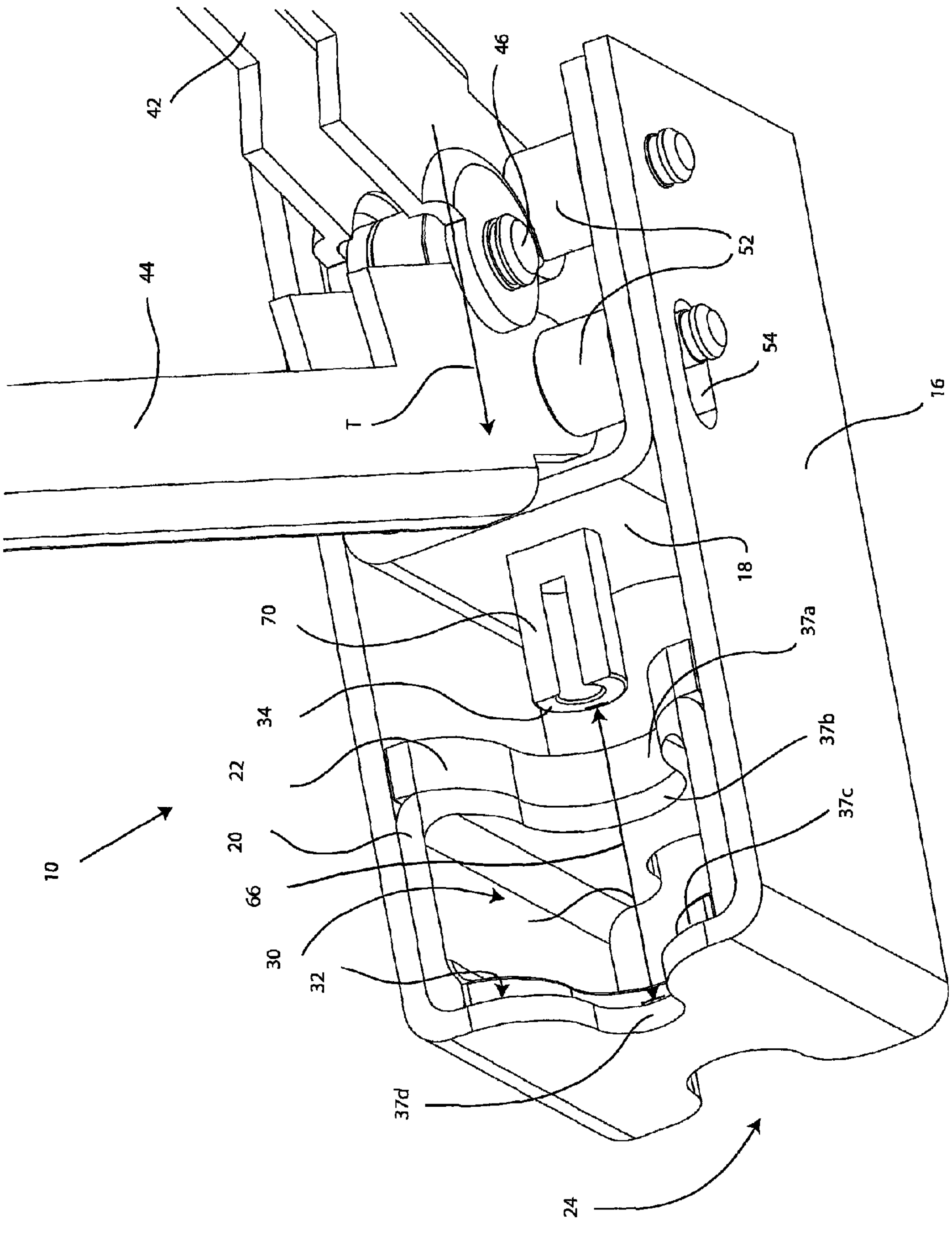
FIG. 6 depicts a perspective view of an embodiment of a second channel and a an embodiment of a second set of jaws of a connector compression tool.

Referring now to FIG. 6, a perspective view of an embodiment of a second channel 30 of an embodiment of a connector compression tool 10 is shown. In other words, FIG. 5 shows the tool 10 turned upside down from the views shown in FIGS. 1-4. The second channel 30 is shown defined by a plurality of recesses 37*a*, 37*b*, 37*c*, 37*d*, in the body portions 16, 20, 22. Particularly, the alignment plate 22 has a recess 37*a*, the jaw offset element 20 has two recesses 37*b*, 37*c*, and the outer frame 16 has a recess 37*d*. Similar to the recesses 36, the recesses 37*a*, 37*b*, 37*c*, 37*d* may include a semi-annular, or half circular section to facilitate receiving of various circular cross sections of a connector 40. The recesses 37*a*, 37*b*, 37*c*, 37*d* may be substantially U-shaped. The edges of where the recesses 37*a*, 37*b*, 37*c*, 37*d* begin may also be rounded, as shown in the Figures, but may alternately come to an angular or sharp point. The diameters and curvature of each of the semi-annular portions of the recesses 37*a*, 37*b*, 37*c*, 37*d* are dimensioned to receive the corresponding diameters and curvature of a length of a second cable connector 40 and an extending cable 74, shown in FIGS. 7-8. While the recesses 37*a*, 37*b*, 37*c*, 37*d* are shown to each include a semi-annular, or half-circular sections, it should be understood that the recesses may be any appropriate shape capable of receiving and compressing a connector. For example, the recesses 37*a*, 37*b*, 37*c*, 37*d* may include partial hexagonal, octagonal or ovular recesses. The shape of the recesses 37 may depend on the shape of the connector to be received and compressed. Additionally, the recesses 37 may have any appropriate depth corresponding to complimentary connector components. Furthermore, each individual recess may have a different shape or dimension than another of the recesses. It should be understood that while the second channel 30 includes a plurality of recesses 37, any number of appropriate recesses 37 are contemplated. For example, even a single recess may define the second channel 30.

With continued reference to FIG. 6, the second set of jaws 32, 34 are shown prior to the reception of a connector. Additionally, a second compression region 66 is shown located between the second set of jaws 32, 34. Jaw 32, is defined by a wall of the outer frame 16 that is distal to the compressor element 18. The jaw 32 includes a compression surface that is defined by the offset between the larger recess 37*c* of the jaw offset body 20 and the smaller recess 37*d* of the outer frame 16. Particularly, the semi-annular section of the recess 36*c* has a larger diameter than the semi-annular section of the recess 36*d* of the outer frame 16. Jaw 34, may comprise a surface of a hollowed receiver element 70. Particularly, the jaw 34 comprises a compression surface on the hollowed receiver element 70 facing the second compression region 66. The hollowed receiver element 70 is a hollowed, semi-cylindrical element that is configured to receive an end of a connector, such as the connector shown in FIG. 9, having a center conductor 76. The second set of jaws 32, 34 are configured to work in conjunction to facilitate compression of a connector. The jaws 32, 34 may act as a pair or set of holding devices or connector engagement elements comprising opposing parts of the connector compression tool 10 to hold and compress a connector. The second set of jaws 32, 34 may be relatively movable toward and away from each other as the actuator 14 is triggered or initiated, as described hereinabove. Particularly, the movement of the compressor element 18 with respect to the outer frame 16 may bring the jaws 32, 34 closer to each other and to compress the second compression region 66.

As shown in FIGS. 7-8, the second channel 30 is shown after reception of the second coaxial cable connector 40. The recess 37*c* is dimensioned to receive a compression ring 72 of the second coaxial cable connector 40, and the smaller recess 37*d* of the outer frame 16 is dimensioned to receive a cable 74 that may extend in the direction T from the second connector 40. The smaller recess 36*d* is configured to prevent movement of the received compression ring 72 in the direction T during compression. The hollowed receiver element 70 is dimensioned to receive a center conductor of the second connector 40.

Figure 9:
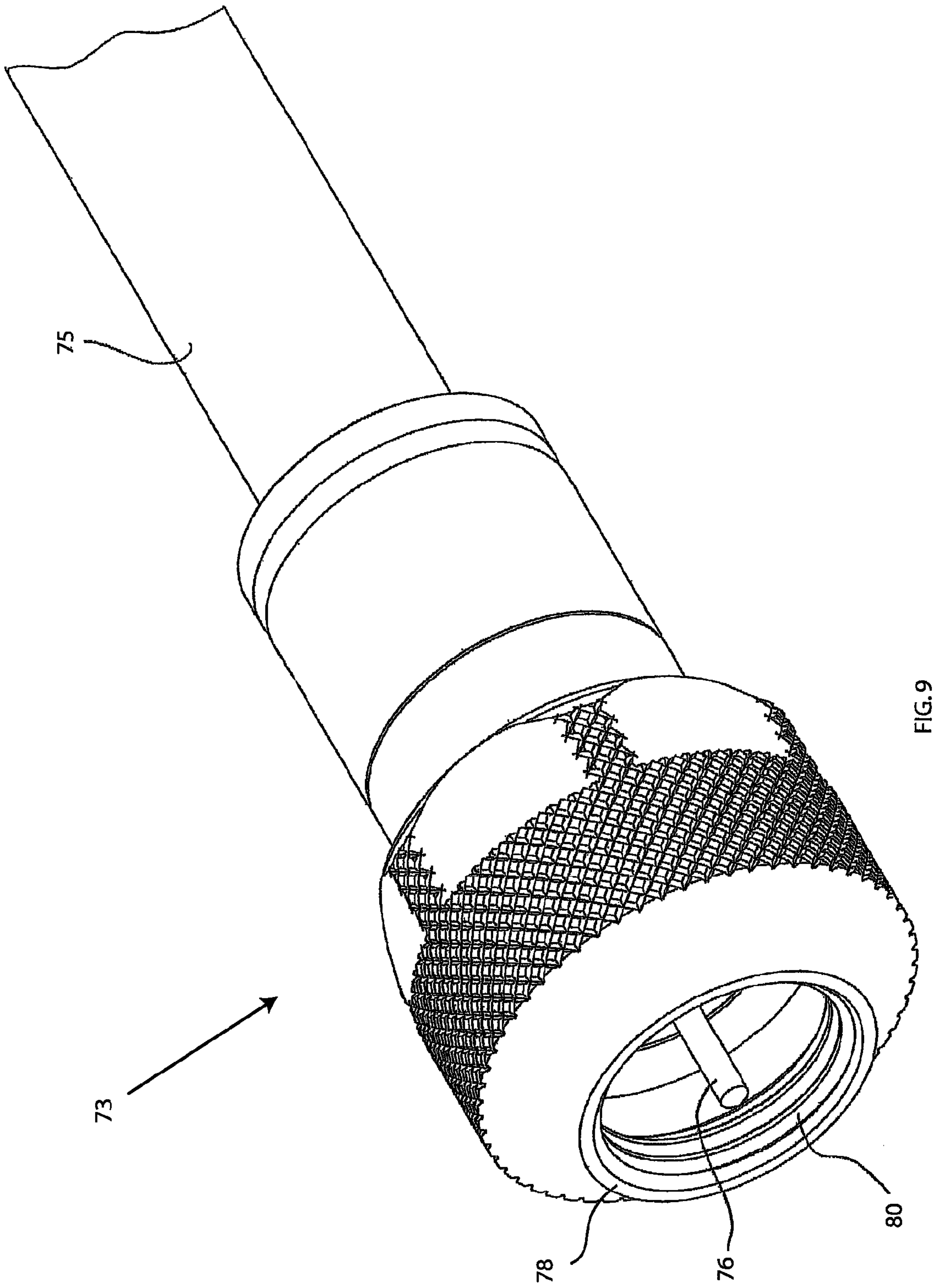
FIG. 9 depicts a perspective view of an embodiment of a second connector.

Shown in FIG. 9 is a perspective view of a connector 73, such as the second connector 40. The connector 73 has an extending cable 75 and a center conductor 76 surrounded by a connector wall 78 and having an inner ring 80. The connector wall 78 is spaced away from the center conductor 76, as is the typical configuration in many coaxial cable connectors. Once the hollowed receiver element 70 receives the connector 73, the jaw 34 may contact the inner ring 80 of the connector 73. The jaw 34 asserts pressure on this inner ring 80, while the jaw 32 prevents movement of the connector 73 in the direction T, thereby compressing the connector 73. Compressing the connector 73 may, for example, connect the connector 73 to the extending cable or wire 75.

FIG. 7 depicts an embodiment of the tool 10 having received the second coaxial cable connector 40 prior to compression of the second connector 40. The second coaxial cable connector 40 may be received into the second channel 30 by placing the coaxial cable connector 40 within the recesses 37 of the channel. The second coaxial cable connector 40 may then be moved in the direction A so that the center conductor 76 is received by the receiver element 70 of the second jaw 34 such that the second jaw 34 contacts the inner ring 80 of the second connector 40. As such, the levers 42, 44 are in the first position 48 prior to movement in the direction O, and prior to movement of the compressor element 18 with respect to the outer frame 16 in the direction T. FIG. 8 depicts the tool 10 after compression of the jaws 32, 34 and of the second connector 40. Thus, the levers 42, 44 are in the second position 50 after being pivotally moved about the fulcrum 46 with respect to each other in the direction O, and after movement of the compressor element 18 with respect to the outer frame 16 in the direction T. In other words, actuating the actuator 14 compresses both the first set of jaws 26, 28, as described hereinabove, and the second set of jaws 32, 34, at the same time. Consequently, only one activation means is required to activate compression of all of the sets of jaws included in the many embodiments described herein. Decompression of the levers 42, 44 may occur when the levers are pivotally moved about the fulcrum 46 with respect to each other back in the direction C. This may cause the compressor element 18 to move in a direction A relative to the outer frame 16.

The outer frame 16 and the compressor element 18 are shown in the Figures each having three walls 82, 84, 86 attached to each other at 90° angles. Rather than being a fully enclosed hollow four-sided body such as the jaw offset element 20, both the outer frame 16 and the compressor element 18 have a missing or open side 88. This side allows for a coaxial cable to extend through without interference, if required. Additionally, the two parallel walls 82, 84 of the compressor element 18 may fit snugly against the corresponding parallel walls 82, 84 of the outer frame 16 to prevent unwanted movement of one of the bodies 16, 18 with respect to the other. However, the compressor element 18 is configured to slide in the directions T and A, with respect to the outer frame 16 as described hereinabove.

The jaw offset element 20 and the alignment element 22 assist in keying the channels 24, 30 to receive an appropriate respective connector. The jaw offset element 20 in the embodiment shown in the Figures is a hollow, substantially four-sided body. The jaw offset element 20 has a total of four recesses 36*c*, 36*d*, 37*b*, 37*c*, two recesses located on each channel 24, 30. The jaw offset element 20 is shown affixed snugly against one side of the outer frame 16 such that the difference in recess dimensions between the jaw offset element 20 and the outer frame 16 may create a compression surface, such as the compression surface of the jaw 32. Furthermore, the alignment element 22 is shown as a single plate, having two recesses 36*b*, 37*a* extending from opposite sides. The alignment element 22 may be affixed to the outer frame 16 snugly next to one of the sides of the jaw offset element 20 such that the difference in recess dimensions between the jaw offset element 20 and the alignment element 22 may create a compression surface, such the compression surface of the jaw 26.

The geometry of the first and second set of jaws 26, 28, 32, 34 may be fixed so that the jaws 26, 28, 32, 34 do not require additional parts or components such as movable stops, flexible-hinges, replaceable components, swiveling elements, springs, pivots, screws and other components to accommodate different sized connectors. While the first set of jaws 26, 28 and the second set of jaws 32, 34 have been described with respect to the embodiment shown in the drawings, other means for accommodating compression of the connectors 38, 40 are contemplated. One means may be compressing a connector, such as one of the connectors 38, 40, between a hollowed receiver element surface, such as the hollowed receiver element 70, and a surface of the body, as described with respect to the second channel 30. Another means may be compressing a connector using a wall of a compressor element, such as the compressor element 18, and a wall of a jaw offset element, such as the jaw offset element 20, as described with respect to the first channel 24. The means for accommodating compression of connectors by the tool may include any number of jaws, and any number of recesses in the body. Additionally, while the jaw offset body 20 and the alignment plate 22 provide an offset for compression surfaces of the jaws described hereinabove, other embodiments may not require these body portions.

Additionally, it should be appreciated that the recesses 36 of the first channel 24 may each be oriented in a reciprocal manner with respect to the connector compression tool 10 such that it may effectively receive a connector. The recesses 37 of the second channel 30 are similarly configured. However, other embodiments of the connector compression tool 10 may include recesses that are not symmetrical to accommodate corresponding other embodiments of connector 73 having differently configured surfaces of various sizes and shapes. Furthermore, while the semi-annular sections of the recesses closely encase 180° of the connector girth in the embodiment depicted in the Figures, the recesses may closely encase more than 180° of the connector girth or less than 180° of the connector girth depending on the embodiment.

It should also be understood that the connectors 38, 40 may be an F-type coaxial cable connectors. For example, the connectors 38, 40 may be connectors for RG-6/U coaxial cable. Any type of coaxial cable is contemplated, however, such as any RG type cable, any H type coaxial cable, any LMR coaxial cable, or any other type of coaxial cable connector that requires compression for attachment to a cable. While the invention has been described with respect to an embodiment for the compression of coaxial cable connectors, the invention is not limited to this embodiment. The tool 10 may be adapted and dimensioned for use with any type of compressible wiring or cable connectors.

Furthermore, the several components of the compression tool 10 may be comprised of various materials useful in assisting the compression of an engaged connector by the tool 10. For example, the entire connector compression tool 10 may be comprised of metal. Moreover, the body 12 of the tool 10 may be formed of metal, while the levers 42, 44 may be comprised of a rigid plastic material. In addition, the levers 42, 44 may be fashioned from wood and the body 12 may be formed of a sturdy composite material, while the fulcrum 46 and movable trunnions 52 may be comprised of metal. It should be understood by those skilled in the art that different embodiments of the connector compression tool 10 may incorporate various components formed of various materials suitable for effecting proper use and operant function of the tool 10 in connecting, compressing, fastening, installing and engaging connectors configured with different sizes.

With continued reference to the Figures, a method of compressing a coaxial cable connector 38, 40 is depicted. The method may comprise providing an embodiment of a connector compression tool 10, wherein the connector compression tool 10 includes a body 12 and a first set of jaws 26, 28 operably associated with the body 12, the first set of jaws having a first recess 36 and dimensioned to compress a first coaxial cable connector (such as first connector 38). The connector compression tool 10 may further include a second set of jaws 32, 34 operably associated with the body 12 and dimensioned to compress a second coaxial cable connector (such as connector 40) having different dimensions than the first connector 38, the second set of jaws 32, 34 having a second recess 37, the recesses 36, 37 residing on a single plane and extending in different directions. The method may further comprise placing at least one of the first connector 38 and the second connector 40 within the provided connector compression tool 10 such that the placed connector operatively engages at least one of the first set of jaws 26, 28 and the second set of jaws 32, 34. The method may further comprise providing an actuator (such as the actuator 14) and activating the actuator. In addition, the method may include compressing the two sets of jaws 26, 28, 32, 34 and also compressing the placed connector. Compression of the two sets of jaws 26, 28, 32, 34 may include operably sliding, moving, or squeezing together portions of the body 12 of the connector 10 upon activating the actuator 14.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coaxial cable connector compression tool comprising:

a body;

an actuator in communication with the body, the actuator comprising a handle having two levers extending from the body, the two levers rotatable about a fulcrum;

a first channel operatively associated with the body and dimensioned for receiving a first coaxial cable connector, the first channel including a first recess extending from a first plane, wherein the first channel is configured to compress the first coaxial cable connector; and a second channel operatively associated with the body and dimensioned for receiving a second coaxial cable connector having different dimensions than the first coaxial cable connector, the second channel including a second recess wherein the second channel is configured to compress the second coaxial cable connector, and wherein the second recess extends from a second plane, the second plane being parallel to the first plane, wherein a portion of the body separates the first recess from the second recess;

wherein compression of the two levers about the fulcrum initiates compression of both the first and second channels.

2. The connector compression tool of claim 1, further comprising an actuator operably attached to the body, the actuator configured to initiate compression of the first and second channel.

3. The connector compression tool of claim 2, wherein the actuator is a handle attached to the body and pivotally movable from a first position to a second position.

4. The connector compression tool of claim 1, wherein each of the first and second recesses are substantially U-shaped.

5. The connector compression tool of claim 4, wherein the at least one recess has a semi-annular section.

6. The connector compression tool of claim 1, wherein at least one of the first and second channel includes a hollow receiver element configured to accept a center conductor of a coaxial cable connector.

7. The connector compression tool of claim 1, wherein the first plane and the second plane are spaced apart from each other and wherein the first recess extends from the first plane in a direction toward the second recess, and wherein the second recess extends from the second plane in a direction toward the first recess.

8. The connector compression tool of claim 1, wherein the first channel includes a first plurality of recesses and the second channel includes a second plurality of recesses.

9. A coaxial cable connector compression tool comprising:

a body;

an actuator in communication with the body, the actuator comprising a handle having two levers extending from the body, the two levers rotatable about a fulcrum;

a first channel operatively associated with the body, the first channel including a first means for accommodating compression of a first coaxial cable connector, wherein rotating the two levers about the fulcrum initiates the first means, and wherein the first means is accessible by a first recess extending from a first plane; and a second channel operatively associated with the body and on an opposite side of the body than the first channel, the second channel including a second means for accommodating compression of a second coaxial cable connector having different dimensions than the first connector, wherein rotating the two levers about the fulcrum initiates the second means, and wherein the second means is accessible by a second recess extending from a second plane, the second plane being parallel to the first plane, wherein the body separates the first recess from the second recess.

10. The connector compression tool of claim 9 wherein at least one of the first and second channels includes a hollow receiver element configured to accept a center conductor of a coaxial cable connector.

* * * * *